(No Model.)

J. R. TORREY.

RAZOR STROP.

No. 272,357. Patented Feb. 13, 1883.

Witnesses:
Charles H. Hall
L. H. Torrey

Inventor:
Joseph R. Torrey

UNITED STATES PATENT OFFICE.

JOSEPH R. TORREY, OF WORCESTER, MASSACHUSETTS.

RAZOR-STROP.

SPECIFICATION forming part of Letters Patent No. 272,357, dated February 13, 1883.

Application filed December 30, 1882. (No model.)

*To all whom it may concern:*

Be it known that I, JOSEPH R. TORREY, of Worcester, in the county of Worcester and State of Massachusetts, have invented certain new and useful Improvements in Razor-Strops; and I do hereby declare that the following is a full, clear, and exact description of the same, reference being had to the accompanying drawings, forming a part of this specification, and in which—

Figure 1:
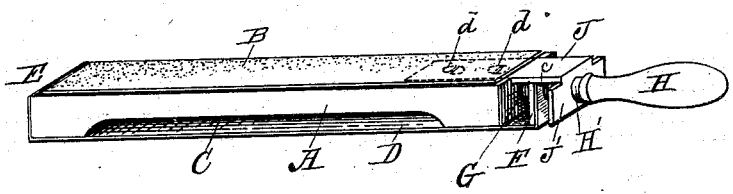
Figure 2:
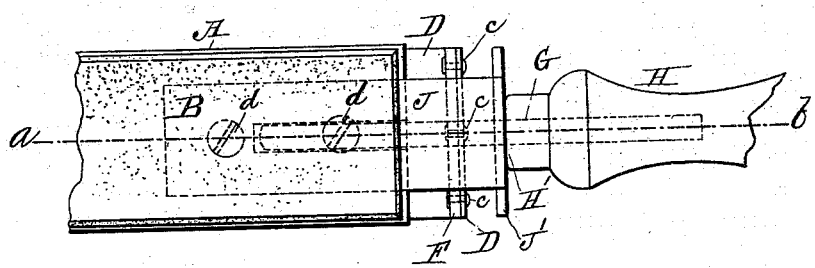

Figure 1 represents a perspective view of a razor-strop embracing my improvements. Fig. 2 represents upon an enlarged scale a top or plan view of so much of the razor-strop shown in Fig. 1 as is necessary to illustrate my said improvements upon the same, which will be hereinafter more fully described; and Fig. 3 represents upon the same enlarged scale as Fig. 2 a central longitudinal section through the parts shown in said Fig. 2, taken on line *a b*, same figure.

To enable those skilled in the art to which my invention belongs to make and use the same, I will proceed to describe it more in detail.

Figure 3:
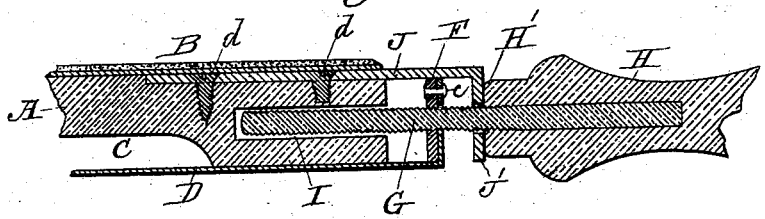

In the drawings, A represents the body part or supporting-block of an ordinary razor-strop, which in this instance is provided upon one side with a hard honing-surface, B, and upon the other side is cut away at C, so as to admit of the use of an elastic belt-strap, D, upon said strop, which is fastened at one end to the outer end, E, of the strop in any convenient manner, and at the other end by means of rivets *c*, or otherwise, to a nut, F, which is fitted over a screw, G, rigidly fastened in the end of handle H, and extended for some distance into a central longitudinal opening, I, formed in the body or block A aforesaid, as represented in section, Fig. 3, of the drawings. Said strop D may be tightened or drawn taut, when desired, by turning handle H and its screw G so as to cause the nut F to travel toward said handle upon the screw, a counter-bearing in advance of the nut being obtained for the end H' of handle H against the part J' of angular plate J, which is rigidly fastened at *d d* to the body A of the strop, upon the opposite side from that which is cut away. Said plate J is recessed or "let into" the part A its whole thickness, so that its outer surface and that of said part A will be upon the same plane, or "flush," thereby admitting of the honing or stropping parts coming upon the side with the plate, to be conveniently fastened over the same, as shown in the drawings.

My invention may be applied to other forms and styles of razor-strops, if desired, having one or more hard honing and cushioned stropping-surfaces, in combination with an elastic stropping-belt, D.

I am aware that an angular plate similar to plate J is employed in a razor-strop embraced in the Patent No. 252,199, granted to H. B. Emerson January 10, 1882, and therefore make no claim, broadly, to such a plate upon a razor-strop.

What I do claim as new and of my invention, and desire to secure by Letters Patent, is—

The combination of handle H, its screw G, and part A, with nut F, rivets *c*, or their equivalents, stropping-belt D, and angular plate J J', the latter rigidly fastened to said part A, all substantially as and for the purpose set forth.

JOSEPH R. TORREY.

Witnesses:
CHARLES S. HALE,
L. H. TORREY.